April 5, 1960
H. C. PETERSON
2,931,899
NEW SIGNAL INDICATOR FOR PANORAMIC RECEIVER
USING TWO MAGNETIC RECORDERS
Filed June 11, 1953
2 Sheets-Sheet 1
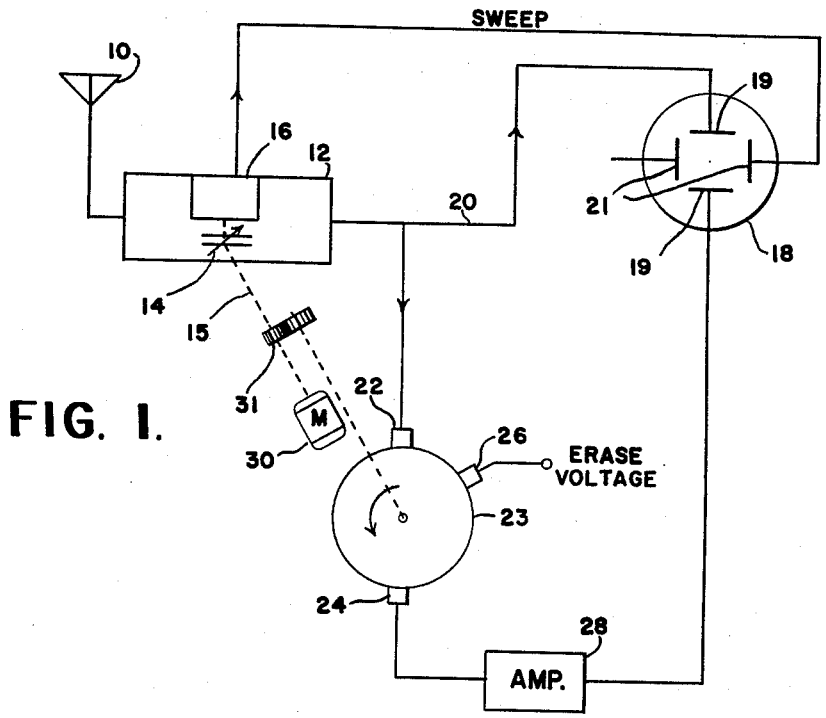
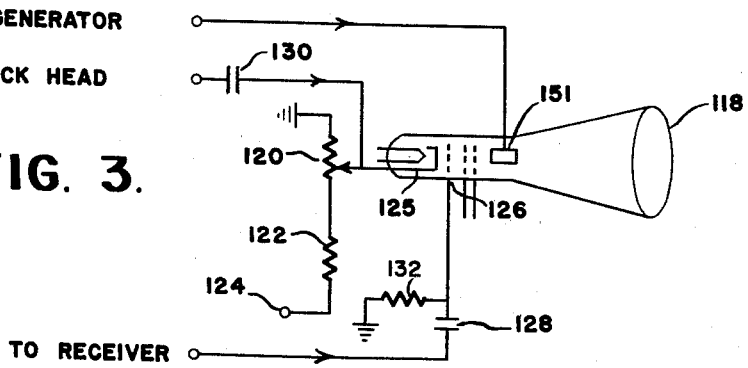
INVENTOR
HERBERT C. PETERSON
BY George Sipkin
B. L. Zangwill
ATTORNEYS

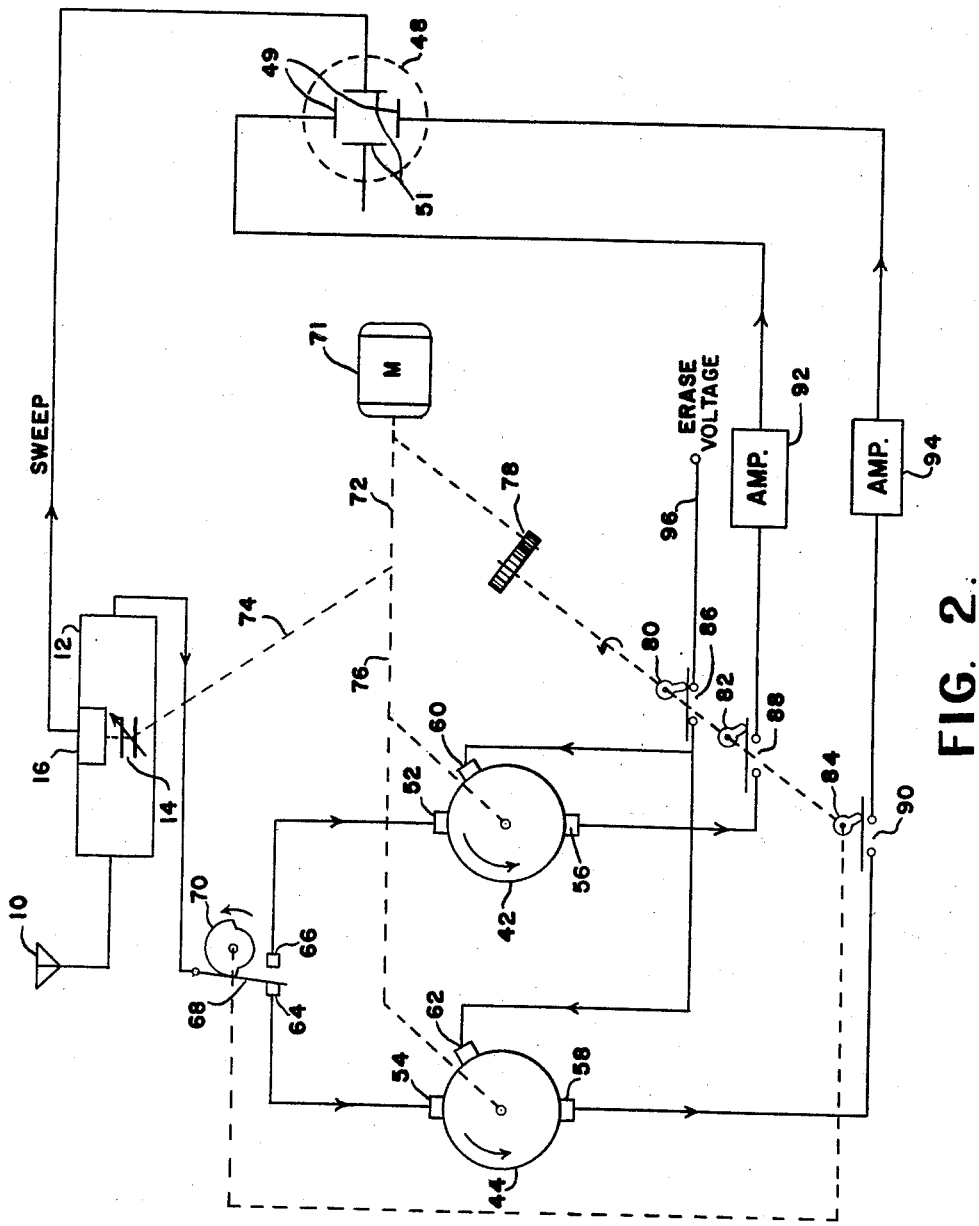

United States Patent Office 2,931,899
Patented Apr. 5, 1960

2,931,899

NEW SIGNAL INDICATOR FOR PANORAMIC RECEIVER USING TWO MAGNETIC RECORDERS

Herbert C. Peterson, Hyattsville, Md., assignor to the United States of America as represented by the Secretary of the Navy Application June 11, 1953, Serial No. 361,100

1 Claim. (Cl. 250—20)

(Granted under Title 35, U.S. Code (1952), sec. 266)

The invention herein described may be manufactured and used by or for the Government of the United States of America for governmental purposes without the payment of any royalties thereon or therefor.

The present invention relates to a new signal indicator for panoramic receivers. Panoramic receivers are commonly used to monitor a portion of the radio frequency spectrum indicating to the observer the signals present in the monitored band. The receiver tuning element is swept or scanned through the band and the signals received during the sweep are applied to a cathode ray tube indicator. In many instances the operator is interested, not in signals that are consantly on the air, but in signals from transmitters which have just come on the air or in the identification of flash signals from transmitters that come on, rapidly send a transmission, and shut down. The present invention provides a system by means of which signals from stations which have just commenced transmission are positively and surely indicated.

An object of the present invention is to provide a panoramic receiver which will indicate the presence of new signals.

A further object of the invention is to provide apparatus capable of indicating the presence of flash transmissions in the radio spectrum.

Another object of the invention is to provide a method for surely and positively indicating the presence of new signals in a particular frequency band.

A still further object of the invention is to provide a method by which indications of persistently received signals in the radio spectrum are cancelled, leaving indications of new or flash signals only.

Other objects and many of the attendant advantages of this invention will be readily appreciated as the same becomes better understood by reference to the following detailed description when considered in connection with the accompanying drawings wherein:

Fig. 1 is a schematic diagram partially in block form of one form of the invention;

Fig. 2 is a schematic diagram of another form of the invention; and

Fig. 3 is a schematic diagram of a modification of a portion of the indicator apparatus which may be applied to the apparatus of either of the preceding figures.

Referring to Fig. 1, an elementary form of the apparatus is shown. A conventional panoramic receiver 12 is adapted to receive radio signals picked up by an antenna 10. The receiver 12 has a tuning element 14 schematically represented as a variable condenser, although obviously other forms of tuning elements may be used such as, for example, variable reactors. The tuning element 14 is continuously driven as by a motor 30 through a shaft 15 so that the receiver periodically sweeps through its tuning range. Included in the panoramic receiver 12 is a sweep generator 16 which may be of any type well known in the art. The sweep generator is triggered by mechanical rotation of the same shaft 15 driving the tuning element so that one sawtooth pulse is produced for each rotation of the shaft 15. The sweep generator may be triggered by an impulse magneto, by a magnetized spot on a recorder drum acting on a pickup head or any other well known pulse producing means. The voltage of the sweep generator is applied to horizontal deflection plates 21 of a panoramic indicator cathode ray tube 18. The deflection plates only of the cathode ray tube are shown. All other cathode ray tube circuits are conventional and have been omitted to simplify the drawing.

The output of the panoramic receiver is applied through a lead 20 to the upper one of a pair of vertical deflection plates 19 of the panoramic indicator tube 18. It will be noted that the arrangement thus far described is that of a conventional and well known panoramic receiver. As the receiver 12 is swept through its tuning range the beam of the cathode ray indicator tube is deflected horizontally by the sweep voltage generated in sweep generator 16. A horizontal trace line then appears on the face of the tube. Any signal picked up by the receiver 12 will result in an output voltage of the receiver which is applied to the vertical deflection plates 19, causing a pip to be produced on the horizontal line. Each transmitter from which a signal is received will therefore be indicated by a vertical pipe on the horizontal trace. Each pip will be located along the horizontal trace at a point determined by the frequency of the transmitter from which the signal originated. The representation on the face of the tube is a plot of the signals present versus frequency over the portion of the spectrum covered.

As has been previously indicated it may be desirable to locate new signals, i.e., signals from transmitters which have just commenced transmission. Accordingly it is desirable to cancel out all indications on the screen of the cathode ray tube which are due to continuously active transmitters which have been identified. The only indications desired are those of new signals or flash transmissions. The outputs over a present scan of the receiver are accordingly cancelled by the stored receiver outputs obtained during a previous sweep or scan of the same frequency band.

The signal output of the receiver 12 is fed to a magnetic recording head or signal impresser 22 and recorded upon a rotating drum 23 of magnetic material. The drum 23 is driven from the motor 30 through a reduction gearing 31. The drum 23 rotates in a counter-clockwise direction as indicated by the arrow thereon and at a speed which is a sub-multiple of the speed of the tuning element 14. The gear reduction shown in Fig. 1 is a 2:1 reduction but any gear ratio which is an integer may be used as will be apparent as the description proceeds.

A play or pickup head 24 has signals generated therein by the signals stored on the magnetic drum 23. These signals are fed through an amplifier 28 to the circuit of the vertical deflection plates 19 of the panoramic indicator tube 18. The signals derived from the play head 24 are connected in the vertical deflection circuit in opposition to the signals applied to this circuit from the panoramic receiver 12. The recording and playback device functions as a time delay system, delaying the received signals an interval which is that required for an integral number of sweeps of the receiver.

An erase head 26 is provided for the magnetic recorder drum 23. This erase head is connected to a source of erase voltage (not shown) as is conventional in the magnetic recording art. A high frequency oscillator circuit is commonly used for an erase power source.

A typical operation of the circuit of Fig. 1 will now be considered. The panoramic receiver is assumed to be in operation with the motor 30 driving tuning element 14 to cause the receiver 12 to scan a band of predetermined frequencies. The sweep generator 16 applies a sawtooth voltage to the horizontal deflection plates 21. Each signal detected over the band results in a receiver output voltage which is applied to the circuit of the vertical deflection plates 19. These voltages are simultaneously applied to the recording head 22 and are magnetically recorded on the recording drum 23. During the first scan of the receiver all signals received will cause a vertical deflection of the beam of the electron tube and pips will be produced on the horizontal trace on the face of the panoramic indicator tube 18. On the second scan of the receiver the recorded data from the first scan, by means of play head 24 and amplifier 28, is applied in phase opposition to the currently received signals from the second scan. As a result if the same signals are present on the second scan that were recorded on the first scan no resultant voltage is applied to the vertical deflection plates 19.

If, however, a new signal is present on the second scan which was not recorded on the first scan there is no recorded signal to cancel out the received signal. A voltage is therefore applied to the vertical deflection plates 19 and a pip appears on the panoramic indicator tube 18.

The arrangement of Fig. 2 carries forward the basic principles described above in connection with Fig. 1. In this modification the incoming signals are first recorded upon one drum over a plurality of sweeps, the signals of each successive sweep reinforcing the recording of the signals obtained on the preceding sweeps. The output of the receiver is then applied to a second recording drum and similarly recorded over another plurality of sweeps. Both recordings are then played back, the resulting voltages being applied in phase opposition to the vertical deflection plates of the panoramic indicator tube.

The panoramic receiver 12, described in connection with Fig. 1, with its associated tuning element 14 and sweep generator 16 is used in the modification of Fig. 2 and the same reference characters have accordingly been used. The sweep voltage from sweep generator 16 is applied to the horizontal deflection plates 51 of the panoramic indicator tube 48 in the same manner as previously described in the case of Fig. 1.

The tuning element 14 and sweep generator 16 are driven by motor 71 through a drive schematically indicated at 72 and 74. Two recorder drums 42 and 44 are also driven directly by motor 71 through a drive element schematically indicated at 76. A series of programming cams 70, 80, 82 and 84 are also driven from motor through a reduction gear 78, which is represented schematically. The ratio of reduction gear 78 has been arbitrarily shown as 6 to 1 but any desired ratio may be chosen as will be explained hereinafter. The programming system is represented by cam operated switches for the purposes of simplicity. Any other equivalent system may be used. Gate tubes or electronic switch tubes triggered by pulses generated from magnetized spots on drum recorders driven by the motor may be used for example.

The recording drums 42 and 44 are equipped with recording heads or signal impressers 52 and 54 respectively. The drums also have play heads or signal pickups 56 and 58 respectively and erase heads 60 and 62 respectively. The recording heads 52 and 54 are adapted to be connected to the output of receiver 12 by means of a single pole, double throw switch having a blade 68, cooperating with fixed contacts 64 and 66. The movable blade 68 is actuated by a cam 70 driven from the motor 71 through reduction gear 78. The play heads 56 and 58 are adapted to be connected to the vertical deflection plate circuit by means of cam operated switches 88 and 90 and amplifiers 92 and 94. Switches 88 and 90 operated by cams 82 and 84 respectively are also driven by motor 71 through reduction gearing 78. Erase heads 60 and 62 are adapted to be connected to a source of erase power (not shown) by means of a switch 86 operated by a cam 80 also driven from the output side of reduction gear 78. The direction of rotation of the cams are indicated by arrows.

The sequence operation of the system of Fig. 2 may be briefly stated as; a storing of the received signals over a plurality of sweeps or scans of a receiver; a storing of received signals over another plurality of sweeps; a comparison of the two stored quantities and an erasure of the stored quantities. This sequence will be described in terms of the elements of the system.

The system is assumed to be in operation with the motor 71 energized. Cam 70 rotating in the direction of the arrow has just operated switch blade 68 causing it to engage the fixed contact 64. The signal output of receiver 12 is then applied to recorder head 54. The magnetic recording drum 44 is being driven in synchronism with the tuning element 14 of receiver 12 and the received signals are stored about the circumference of the drum in the order they are received. The signals during successive sweeps of the receiver are superposed on the record made of the first sweep, the signals of a particular frequency being recorded at the same spot on the circumference drum during each revolution. Switch blade 68 remains closed to fixed contact 64 while the receiver 12 makes three sweeps in the modification as illustrated. As a result magnetic drum 44 at end of three sweeps has an integrated pattern of the signals received during these three sweeps stored thereon. Switch blade 68 following the surface of cam 70 now moves into engagement with fixed contact 66. The signals received over the next three sweeps of the receiver 12 are now applied to recording head 52 and stored on the magnetic drum 42, in the same manner that the previous signals were stored on drum 44. After the second three sweeps have been recorded switches 88 and 90 are closed by their respective cams 82 and 84. Play-back heads 56 and 58 are connected through these switches and amplifiers 92 and 94 to the vertical deflection plates 49 of the panoramic indicator tube 48.

The electrical outputs of the two play-back heads are connected in voltage opposition so that the voltage applied to the vertical deflection circuit is proportional to the difference or resultant of the recorded signals over the two plural sweep periods. The horizontal sweep voltage is synchronized with the start of the play-back period. After the recorded signals have been applied to the indicator tube the erase switch 86 is closed by its associated cam 80 to apply erase voltage to erase heads 60 and 62 and remove the recorded signals from the drums.

It will be apparent from the above description that any signal indication appearing on the panoramic indicator tube 48 will be the result of a signal appearing which appeared and was recorded during one set of sweeps and not during the other. The direction of deflection of the pip will indicate whether the signal is due to a "new" station, that is a flash transmission or a transmitter which has left the air.

The plural sweep integration serves at least two functions. The length of the period or number of sweeps may be chosen to be that required to produce a positive indication of a flash transmission. The integration due to the superimposing or adding of signals over a plurality of sweeps tends to eliminate spurious signals due to noise or other random signals. A noise signal is recorded only during a single sweep of the receiver. The record is not reinforced during subsequent sweeps and will not generate a strong voltage. The gain of the amplifiers 92 and 94 may be adjusted to practically eliminate the effect of such weak recordings on the indicator tube 48.

The cathode ray tube indicators of Figs. 1 and 2 are arranged to produce vertical deflections or pips in response to signals applied thereto. Obviously, however, amplitude modulation of the electron stream of the cathode ray tube may be used in place of vertical deflection of the beam. A bright spot on a weak trace may be used for indication. Fig. 3 is a fragmentary schematic view of a panoramic indicator tube connected in this manner.

A cathode ray indicator tube 118 has a cathode 125 connected to a variable tap of a voltage divider 120 connected at one end to ground and at the other end through a resistor 122 to a source of positive bias potential indicated at 124. A control grid 126 is connected to ground through a conventional grid leak resistance 132. Signals are applied to the control grid 126 through a condenser 128 and to the cathode 125 through a condenser 130. These signals may be derived, for example, from the receiver 12 and the play-back head 24 respectively of the apparatus shown in Fig. 1. The horizontal deflecting plates, indicated at 151, are connected to sweep generator 16 and the vertical deflecting plates have no signal applied thereto. The remaining cathode ray tube elements are connected to proper sources of voltage in accordance with conventional practice in the cathode ray tube art. These connections have not been shown in the interest of simplification of the drawing.

It will be apparent that if equal positive going signals are applied to the cathode 125 and grid 126 at the same instant no net change results and no indication on the tube is observed. If, however, a positive going signal is applied from the receiver to grid 126 which is not balanced by an equal signal from the recorded previous sweep a bright spot will be formed on the trace indicating the presence of a new station.

The systems described above eliminate to a large extent the tedious and difficult task of interpretation of the indication of a panoramic indicator tube in a search for new stations or flash transmissions. Transmitters on the air for substantial periods of time leave no indication of their presence on the tube. Such stations are readily investigated. New stations, however, result in an indication which indicates their presence on the band to the operator. Their transmission may then be monitored. The effect of noise and other spurious radiation on the indicator system is minimized. The monitoring of a portion of the radio spectrum for new stations becomes a relatively easy task.

Obviously many modifications and variations of the present invention are possible in the light of the above teachings. It is therefore to be understood that within the scope of the appended claim the invention may be practiced otherwise than as specifically described.

What is claimed is:

A panoramic receiver indicator system for reducing the effects of noise and constant signals comprising a panoramic receiver having a variable tuning element adapted to continuously and cyclically sweep a predetermined frequency range and a sweep generator synchronized with said tuning element, a pair of recorder elements having a recording head, a playback head and an erase head, each element having a recording time equal to the time of one range sweep of said receiver, a cathode ray tube indicator having one input connected to said sweep generator, a synchronous switching means connected between said receiver and a first one of said recorder elements for recording a first predetermined number of sweeps and a second one of said recorder elements for recording a second predetermined number of sweeps equal to said first predetermined number of sweeps, means including said switching means connected between the playback head of each recorder to said indicator in phase opposition to each other at the end of said first and second predetermined number of sweeps whereby constant signal inputs to said receiver are eliminated, a motor driving said tuning element, said recorder elements and said switching means in synchronism, and means including said switching means for energizing said erase heads of said recorder elements for eliminating the recording on said elements after said first and second predetermined number of sweeps.

References Cited in the file of this patent

UNITED STATES PATENTS

| | | |
|---|---|---|
| 2,410,424 | Brown | Nov. 5, 1946 |
| 2,411,494 | Bliss | Nov. 19, 1946 |
| 2,422,135 | Sanders | June 10, 1947 |
| 2,430,038 | Wertz | Nov. 4, 1947 |
| 2,455,052 | Fisher | Nov. 30, 1948 |
| 2,530,828 | Leverenz | Nov. 21, 1950 |
| 2,566,189 | Gloess | Aug. 28, 1951 |